United States Patent
Lindberg

(10) Patent No.: US 9,560,316 B1
(45) Date of Patent: Jan. 31, 2017

(54) INDICATING SOUND QUALITY DURING A CONFERENCE

(71) Applicant: Google Inc., Mountain View, CA (US)

(72) Inventor: Jonas Erik Lindberg, Stockholm (SE)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/465,793

(22) Filed: Aug. 21, 2014

(51) Int. Cl.
| | |
|---|---|
| *H04N 7/15* | (2006.01) |
| *H04R 29/00* | (2006.01) |
| *G10L 21/043* | (2013.01) |
| *G10L 21/10* | (2013.01) |

(52) U.S. Cl.
CPC .............. *H04N 7/15* (2013.01); *G10L 21/10* (2013.01); *H04R 29/008* (2013.01)

(58) Field of Classification Search
None
See application file for complete search history.

(56) References Cited

U.S. PATENT DOCUMENTS

| | | | |
|---|---|---|---|
| 6,888,935 B1 | 5/2005 | Day | |
| 7,187,764 B2* | 3/2007 | Ruetschi | H04M 3/56 370/260 |
| 7,295,982 B1* | 11/2007 | Cohen | G10L 25/69 704/208 |
| 7,545,923 B1 | 6/2009 | Campion | |
| 8,670,018 B2 | 3/2014 | Cunnington et al. | |
| 2009/0030693 A1* | 1/2009 | Shaffer | G10L 25/69 704/270 |
| 2009/0168984 A1* | 7/2009 | Kreiner | H04M 3/2227 379/202.01 |
| 2009/0214016 A1* | 8/2009 | O'Sullivan | H04M 3/56 379/202.01 |
| 2011/0096137 A1* | 4/2011 | Baker | H04N 7/15 348/14.08 |
| 2011/0225247 A1* | 9/2011 | Anantharaman | H04M 3/568 709/206 |
| 2012/0128146 A1* | 5/2012 | Boss | H04M 3/56 379/202.01 |
| 2012/0308044 A1* | 12/2012 | Vander Mey | H04L 12/1822 381/104 |
| 2013/0234826 A1* | 9/2013 | Sekiguchi | G06F 3/013 340/5.53 |

* cited by examiner

*Primary Examiner* — Fan Tsang
*Assistant Examiner* — Jeffrey Lytle

(57) ABSTRACT

Implementations generally relate to indicating sound quality during a conference, thereby providing real-time feedback to those generating audio intentionally or unintentionally. In some implementations, a method includes detecting an audio signal during a conference. The method further includes determining one or more sound types in the audio signal based on one or more respective characteristic criteria. The method further includes providing an indicator based on the one or more sounds types.

19 Claims, 4 Drawing Sheets

INDICATING SOUND QUALITY DURING A CONFERENCE

BACKGROUND

Video conferencing is often used in business settings and enables participants to share content with each other in real-time across geographically dispersed locations. A communication device at each location typically uses a video camera and microphone to send video and audio streams, and uses a video monitor and speaker to play received video and audio streams. The communication devices maintain a data linkage via a network, and transmit video and audio streams in real-time across the network from one location to another.

SUMMARY

Implementations generally relate to indicating sound quality during a conference. In some implementations, a method includes detecting an audio signal during a conference. The method further includes determining one or more sound types in the audio signal based on one or more respective characteristic criteria. The method further includes providing an indicator based on the one or more sounds types.

With further regard to the method, in some implementations, the conference is a video conference. In some implementations, at least one sound type is a voice of a main speaker. In some implementations, one or more of the characteristic criteria are based on comprehensibility. In some implementations, one or more of the characteristic criteria are based on voice quality. In some implementations, the method further includes determining at least one quality value based on at least one of the sound types. In some implementations, the method further includes determining at least one quality value based on at least one of the sound types, where the at least one quality value is volume level. In some implementations, the method further includes: determining at least one quality value based on at least one of the sound types; and providing the indicator if the at least one quality value does not meet a predetermined quality threshold. In some implementations, the indicator prompts a particular user to speak louder. In some implementations, the indicator prompts a particular user to move closer to a microphone.

In some implementations, a method includes detecting an audio signal during a conference, where the conference is a video conference. The method further includes determining one or more sound types in the audio signal based on one or more respective characteristic criteria, where at least one sound type is a voice of a main speaker, and where one or more of the characteristic criteria are based on voice quality. The method further includes determining at least one quality value based on at least one of the sound types, where the at least one quality value is volume level. The method further includes providing an indicator based on the one or more sounds types, where the indicator prompts a particular user to speak louder.

In some implementations, a system includes one or more processors, and logic encoded in one or more tangible media for execution by the one or more processors. When executed, the logic is operable to perform operations including: detecting an audio signal during a conference; determining one or more sound types in the audio signal based on one or more respective characteristic criteria; and providing an indicator based on the one or more sounds types.

With further regard to the system, in some implementations, the conference is a video conference. In some implementations, at least one sound type is a voice of a main speaker. In some implementations, one or more of the characteristic criteria are based on comprehensibility. In some implementations, one or more of the characteristic criteria are based on voice quality. In some implementations, the logic when executed is further operable to perform operations including determining at least one quality value based on at least one of the sound types. In some implementations, the logic when executed is further operable to perform operations including determining at least one quality value based on at least one of the sound types, where the at least one quality value is volume level. In some implementations, the logic when executed is further operable to perform operations including: determining at least one quality value based on at least one of the sound types; and providing the indicator if the at least one quality value does not meet a predetermined quality threshold. In some implementations, the indicator prompts a particular user to speak louder.

DETAILED DESCRIPTION

Implementations described herein indicate sound quality during a conference, thereby providing real-time feedback to participants generating audio intentionally or unintentionally. For example, such real-time feedback makes participants aware if their speech is not intelligible, or when participants are accidentally making distracting noise. In various implementations, a system provides feedback to participants with regard to sound quality during a conference such as a video conference. In some implementations, the system detects an audio signal during the conference. The system then determines one or more sound types in the audio signal based on one or more respective characteristic criteria. For example, in various implementations, a sound type may be the voice of a main speaker, where one or more of the characteristic criteria are based on voice quality. In some implementations, the system determines at least one quality value based on at least one of the sound types. For example, in some implementations, the quality value may be volume level. In various implementations, after the system determines at least one quality value based on at least one of the sound types, the system provides an indicator based on the one or more sounds types. In various implementations, the system may provide the indicator if the quality value does not meet a predetermined quality threshold. For example, in some implementations, if the voice of the main speaker is not sufficiently loud, the system may provide an indicator that prompts the main speaker to speak louder.

Figure 1:
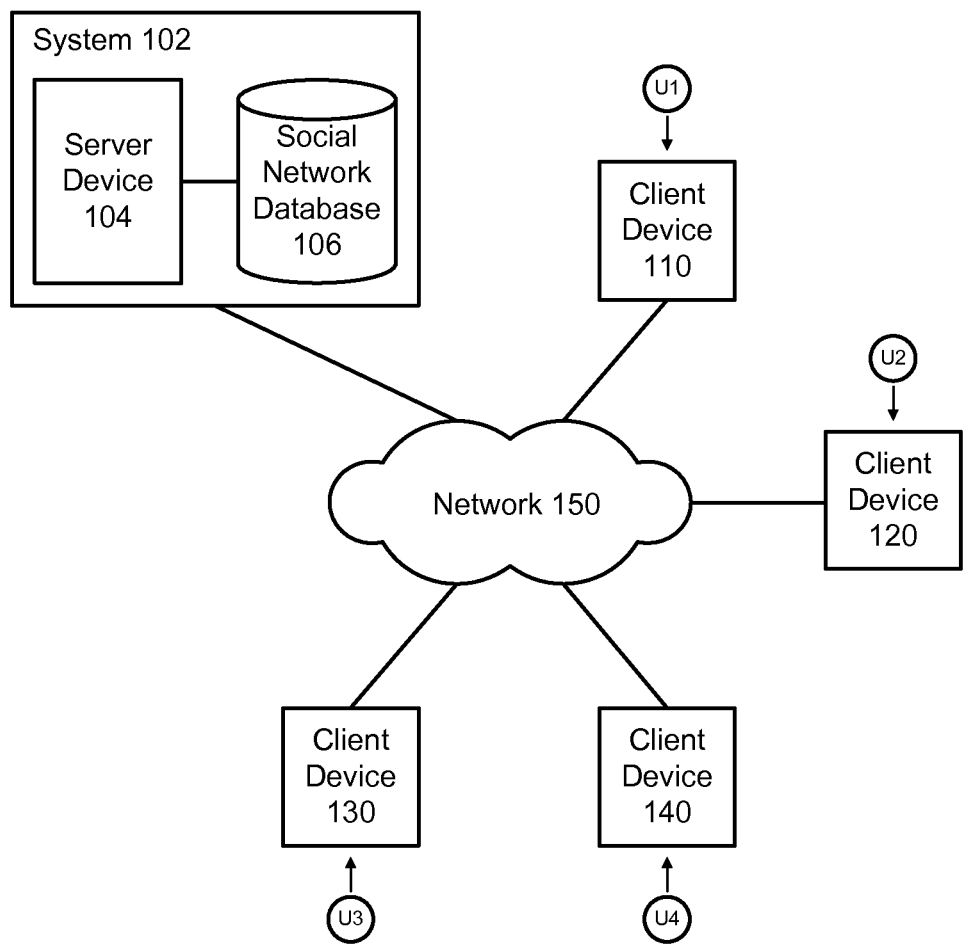
FIG. 1 illustrates a block diagram of an example network environment, which may be used to implement the implementations described herein.

FIG. 1 illustrates a block diagram of an example network environment 100, which may be used to implement the implementations described herein. In some implementations, network environment 100 includes a system 102, which includes a server device 104 and a social network database 106. In various implementations, the term system 102 and phrase "social network system" may be used interchangeably. Network environment 100 also includes client devices 110, 120, 130, and 140, which may communicate with each other via system 102. Network environment 100 also includes a network 150.

For ease of illustration, FIG. 1 shows one block for each of system 102, server device 104, and social network database 106, and shows four blocks for client devices 110, 120, 130, and 140. Blocks 102, 104, and 106 may represent multiple systems, server devices, and social network databases. Also, there may be any number of client devices. In other implementations, network environment 100 may not have all of the components shown and/or may have other elements including other types of elements instead of, or in addition to, those shown herein.

In various implementations, users U1, U2, U3, and U4 may communicate with each other using respective client devices 110, 120, 130, and 140. For example, users U1, U2, U3, and U4 may interact with each other in a multi-user video conference, where respective client devices 110, 120, 130, and 140 transmit media streams to each other.

In the various implementations described herein, the processor of system 102 causes the elements described herein (e.g., video streams, messages, indications, etc.) to be displayed in a user interface on one or more display screens.

Figure 2:
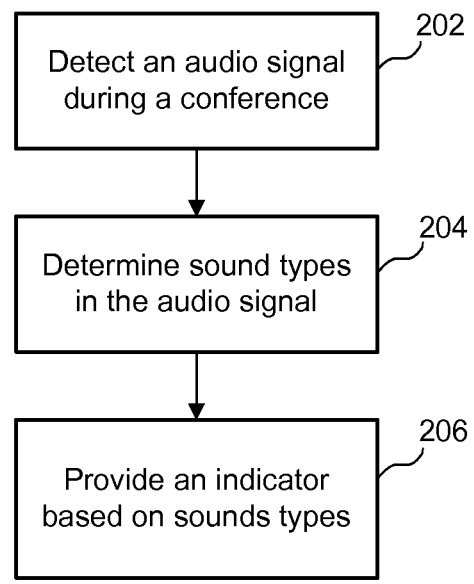
FIG. 2 illustrates an example simplified flow diagram for indicating sound quality during a conference, according to some implementations.

FIG. 2 illustrates an example simplified flow diagram for indicating sound quality during a conference, according to some implementations. Referring to both FIGS. 1 and 2, a method is initiated in block 202, where system 102 detects an audio signal during a conference. As described in more detail below, the audio signal may include one or more sounds from one or more different sources, where the different sounds may have different sound types. For example, one sound type may a human voice (e.g., a main speaker). Another sound type may be non-speech sound (e.g., background noise).

In various implementations, the conference is a video conference. While various implementations are described herein in the context of video conferences, these implementations and other also apply to other types of conferences. For example, in some implementations, the conference may be a telephone conference.

For ease of illustration, various implementations are described in the context of a single audio signal. However, these implementations and others may apply to multiple audio signals. For example, in various implementations, system 102 may receive different audio signals from different sources (e.g., from different microphones from different locations). In some implementations, system 102 may process each of the audio signals separately. In some implementations, system 102 may also combine the audio signals into a one audio signal, where the audio signal may contain a combination of multiple signal components, each component corresponding to a different sound source.

In block 204, system 102 determines one or more sound types in the audio signal based on one or more respective characteristic criteria. For example, as indicated above, in some implementations, one sound type may a human voice (e.g., the voice of a main speaker). In some implementations, another sound type may be a non-speech sound (e.g., background noise).

In various implementations, system 102 may determine the sound type based on characteristic criteria. In some various implementations, one or more of the characteristic criteria may be based on voice quality. For example, system 102 may detect frequency patterns that may have voice qualities (e.g., having frequencies that fall within a normal voice frequency range, having a fluctuating amplitude indicative of speech, etc.). As such, system 102 may determine the sound type to be a person speaking.

In some implementations, one or more of the characteristic criteria may be based on comprehensibility. For example, if system 102 can decipher words from a sound, the sound is likely to be human sound. If system 102 is able to construct sentences from the sound, the sound is likely to be comprehensible. As such, if system 102 can detect a comprehensible sentence, system 102 may determine the sound type to be a main speaker.

In some implementations, system 102 may utilize a speech-to-text algorithm to display written text to the speaker. Such feedback may indicate to the speaker whether he or she is being understood. If the speech-to-text output is not accurate, the speaker may try speaking louder or closer the microphone to see of the speech-to-text output improves.

In some implementations, one or more of the characteristic criteria may be based on incomprehensibility. For example, in some implementations, system 102 may decipher little to no words from a sound but may detect particular frequency patterns, where the sound is likely to be human sound, yet undecipherable. As such, system 102 may determine the sound type to be side conversations (e.g., not the main speaker).

In block 206, system 102 provides an indicator based on the one or more sounds types. Example implementations for providing indicators based on sound types are described in detail below.

Figure 3:
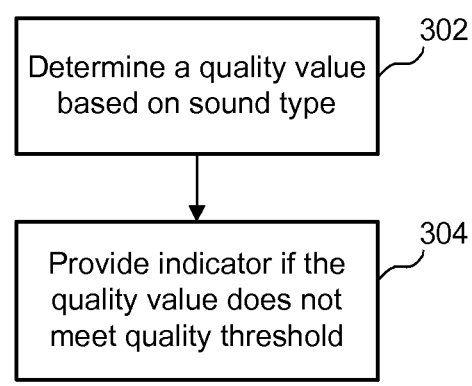
FIG. 3 illustrates an example simplified flow diagram for providing sound indicators during a conference, according to some implementations.

FIG. 3 illustrates an example simplified flow diagram for providing sound indicators during a conference, according to some implementations. Referring to both FIGS. 1 and 3, a method is initiated in block 302, where system 102 determines at least one quality value based on at least one of the sound types. For example, in some implementations, system 102 may determine that a sound type is the voice of a main speaker with an associated quality value of volume level (e.g., in decibels).

In block 304, system 102 provides the indicator if the at least one quality value does not meet a predetermined quality threshold. For example, if the input volume level is too low (e.g., decibel reading does not meet a predetermined minimum decibel level), system 102 may cause the indicator to prompt a particular user to speak louder (e.g., "Please speak louder."). In some implementations, system 102 may cause the indicator to prompt a particular user to move closer to a microphone (e.g., "Please move closer to the microphone."). The following describes other example implementations.

In some implementations, system 102 may detect two or more different sound types. For example, one sound type may be the sound of a voice of a main speaker, and the other sound type may be non-speech sound (e.g., background noise). In some scenarios, the same microphone may detect two different sounds of two different sound types. For example, the microphone may pick up both the voice of a main speaker and background noise. Such background noise may include various types of noise such as paper shuffling, pens tapping on a desk, phone sounds, etc. In some implementations, if one sound type is a non-speech sound (e.g., background noise) and is sufficiently loud to possibly cause a distraction while the microphone is also picking up the voice of a speaker, system 102 may cause the indicator to prompt the participants to be aware of distracting sound that may distract from the main speaker (e.g., "The background noise is too high.").

In another scenario, two different microphones may detect the two different sounds of two different sound types, where one microphone detects the voice of a main speaker, and another microphone detects background noise. In some implementations, if one sound type is a non-speech sound (e.g., background noise) and is sufficiently loud enough to cause a distraction, system 102 may cause the indicator associated with the microphone detecting the background noise to prompt the participants to be aware of distracting sound that may distract from the main speaker (e.g., "The background noise is too high."). System may also cause the indicator to prompt the participant to mute their microphone (e.g., "Please mute microphone. The background noise is too high.").

In some implementations, system 102 may detect a side conversation between two or more individuals. Similar to the scenario above with background noise, system 102 may detect both a main speaker and the side conversation. As such, system 102 may cause an indicator to prompt the participants at the microphone detecting the side conversation to mute their microphone (e.g., "Please mute microphone. Your side conversation may be distracting."). In various implementations, the main speaker may be considered the only person speaking and/or the person speaking the loudest at the given time.

Implementations described herein provide various benefits. For example, implementations provide feedback when the audio is suboptimal. As such, remote participants need not interrupt the person speaking due inability to hear the speaker. Implementations may also cover a large room with multiple microphones, where audio quality may vary, depending on where people are sitting or standing in the room. Implementations detect audio problems and provide feedback for correction. As a result, implementations described herein also increase overall engagement among users in a social networking environment.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

While system 102 is described as performing the steps as described in the implementations herein, any suitable component or combination of components of system 102 or any suitable processor or processors associated with system 102 may perform the steps described.

Figure 4:
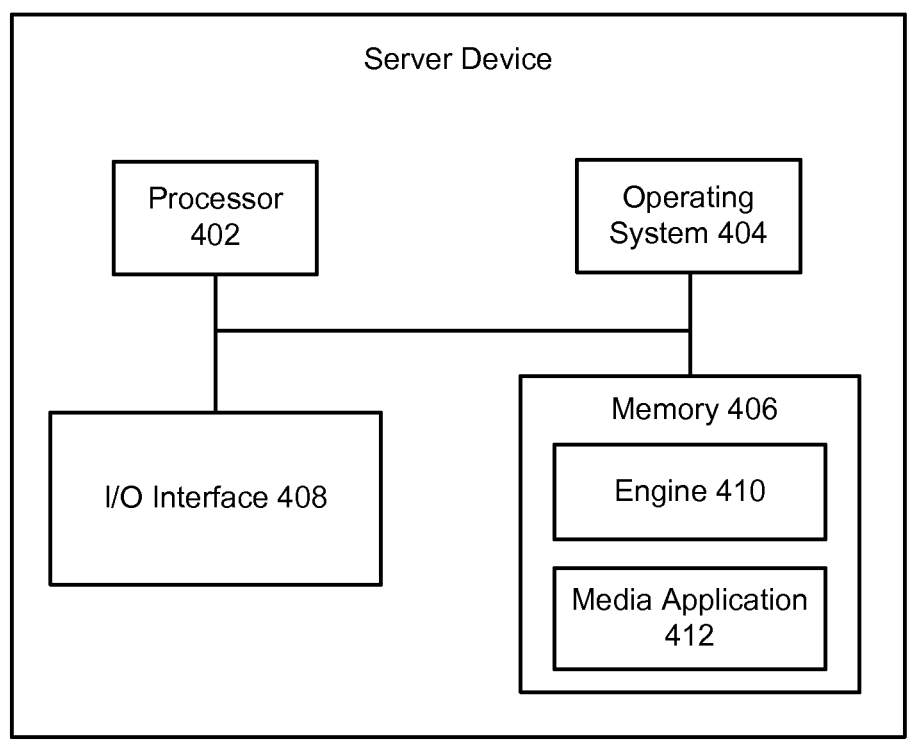
FIG. 4 illustrates a block diagram of an example server device, which may be used to implement the implementations described herein.

FIG. 4 illustrates a block diagram of an example server device 400, which may be used to implement the implementations described herein. For example, server device 400 may be used to implement server device 104 of FIG. 1, as well as to perform the method implementations described herein. In some implementations, server device 400 includes a processor 402, an operating system 404, a memory 406, and an input/output (I/O) interface 408. Server device 400 also includes a network engine 410 and a media application 412, which may be stored in memory 406 or on any other suitable storage location or computer-readable medium. Media application 412 provides instructions that enable processor 402 to perform the functions described herein and other functions.

For ease of illustration, FIG. 4 shows one block for each of processor 402, operating system 404, memory 406, I/O interface 408, network engine 410, and media application 412. These blocks 402, 404, 406, 408, 410, and 412 may represent multiple processors, operating systems, memories, I/O interfaces, network engines, and media applications. In other implementations, server device 400 may not have all of the components shown and/or may have other elements including other types of elements instead of, or in addition to, those shown herein.

Although the description has been described with respect to particular embodiments thereof, these particular embodiments are merely illustrative, and not restrictive. Concepts illustrated in the examples may be applied to other examples and implementations. For example, some implementations are described herein in the context of a social network system. However, the implementations described herein may apply in contexts other than a social network. For example, implementations may also apply to video conferencing, telephone conferencing, and other types of conferencing systems.

Note that the functional blocks, methods, devices, and systems described in the present disclosure may be integrated or divided into different combinations of systems, devices, and functional blocks as would be known to those skilled in the art.

Any suitable programming languages and programming techniques may be used to implement the routines of particular embodiments. Different programming techniques may be employed such as procedural or object-oriented. The routines may execute on a single processing device or multiple processors. Although the steps, operations, or computations may be presented in a specific order, the order may be changed in different particular embodiments. In some particular embodiments, multiple steps shown as sequential in this specification may be performed at the same time.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions for execution by the processor. For example, a tangible medium such as a hardware storage device can be used to store the control logic, which can include executable instructions. The software instructions can also be contained in, and provided as, an electronic signal, for example in the form of software as a service (SaaS) delivered from a server (e.g., a distributed system and/or a cloud computing system).

What is claimed is:

1. A computer-implemented method comprising:
    detecting a plurality of audio signals during a video conference, wherein a first audio signal of the plurality of audio signals detected from a first user device of a first user includes a first sound type and wherein a second audio signal of the plurality of audio signals detected from a second user device of a second user includes a second sound type;
    deciphering a plurality of words from the first audio signal;
    determining the first audio signal is comprehensible by constructing sentences from the deciphered plurality of words;
    determining the first sound type is the voice of a main speaker based, at least in part, on determining the first audio signal is comprehensible;
    determining that the second sound type of the second audio signal is a side conversation different from the main speaker voice based, at least in part, on the second audio signal being substantially incomprehensible;
    determining a quality value of the first sound type, wherein the quality value is based on volume level of the first audio signal;
    providing a first indicator based on the quality value of the first audio signal, wherein the first indicator prompts the first user to speak louder; and
    providing a second indicator to prompt the second user of the side conversation.

2. The method of claim 1, wherein determining the second sound type is a side conversation is based, at least in part, on a frequency pattern of the second audio signal associated with at least one voice and further based, at least in part, on incomprehensibility of the second audio signal.

3. The method of claim 1, wherein the indicator prompts to mute the second user device.

4. The method of claim 1, wherein determining the first sound type is the voice of the main speaker is further based on detecting a frequency pattern of the first audio signal.

5. A computer-implemented method comprising:
    detecting a plurality of audio signals during a conference, wherein a first audio signal of the plurality of audio signals detected from a first user device includes a first sound type and wherein a second audio signal of the plurality of audio signals detected from a second user device from a second user includes a second sound type;
    deciphering a plurality of words from the first audio signals;
    determining the first audio signal is comprehensible by constructing at least one sentence from the deciphered plurality of words;
    determining the first sound type is the voice of a main speaker based, at least in part, on determining the first sound type is comprehensible;
    determining the second sound type of the second audio signal is a background sound based, at least in part, on detection of non-speech sound in the second audio signal, based, at least in part, on the second sound type being undecipherable; and
    providing a first indicator based on the background sound exceeding a threshold volume level, wherein the first indicator prompts awareness of the background sound.

6. The method of claim 5, wherein the conference is a telephone conference.

7. The method of claim 5, wherein determining the first sound type is the voice of the main speaker is further based on determining at least one volume level of the second sound type.

8. The method of claim 2, further comprising:
    determining at least one quality value of the first sound type; and
    providing a second indicator if the at least one quality value does not meet a predetermined quality threshold.

9. The method of claim 5, wherein the first indicator prompts to mute the second user device.

10. The method of claim 5, further comprises determining a third sound type is a side conversation based, at least in part, on a third frequency pattern of a third audio signal associated with at least one voice and further based, at least in part, on incomprehensibility of the third audio signal.

11. The method of claim 5, wherein determining the first sound type is the voice of the main speaker is further based on detecting a frequency pattern of the first audio signal.

12. The method of claim 5, further comprising displaying to the main speaker written text of the first audio signal.

13. A system comprising:
    one or more processors; and
    logic encoded in one or more tangible media for execution by the one or more processors and when executed operable to perform operations comprising:
    detecting a plurality of audio signals during a conference, wherein a first audio signal of the plurality of audio signals detected from a first user device of a first user includes a first sound type and wherein a second audio signal of the plurality of audio signals detected from a second user device of a second user includes a second sound type;
    deciphering a plurality of words from the first audio signal;
    determining the first audio signal of the first audio signal is comprehensible by constructing at least one sentence from the deciphered plurality of words;
    determining the first sound type is the voice of a main speaker based, at least in part, on determining the first sound type is comprehensible;
    determining the second sound type of the second audio signal is a background sound based, at least in part, on detection of non-speech sound of the second sound type of the second audio signal, based, at least in part, on the second sound type being undecipherable; and
    providing a first indicator based on the background sound exceeding a threshold volume level, wherein the first indicator prompts awareness of the background sound.

14. The system of claim 13, wherein the conference is a video conference.

15. The system of claim 13, wherein the logic when executed is further operable to perform operations comprising determining the first sound type is the voice of the main speaker is further based on at least one volume level of the first sound type.

16. The system of claim 13, wherein the logic when executed is further operable to perform operations comprising:
    determining at least one quality value of the first sound type; and
    providing a second indicator if the at least one quality value does not meet a predetermined quality threshold.

17. The system of claim 13, wherein the logic when executed is further operable to perform operations comprising determining a third sound type is a side conversation based, at least in part, on a third frequency pattern of a third audio signal associated with at least one voice and further based, at least in part, on incomprehensibility of the third audio signal.

18. The system of claim 13, wherein the first indicator prompts to mute the second user device.

19. The system of claim 13, wherein the logic when executed is further operable to perform operations comprising displaying to the main speaker written text of the first audio signal.

* * * * *